Dec. 2, 1941.   H. SINCLAIR ET AL   2,264,341
ROTARY POWER TRANSMITTER EMPLOYING A WORKING LIQUID
Filed June 13, 1940   5 Sheets-Sheet 1

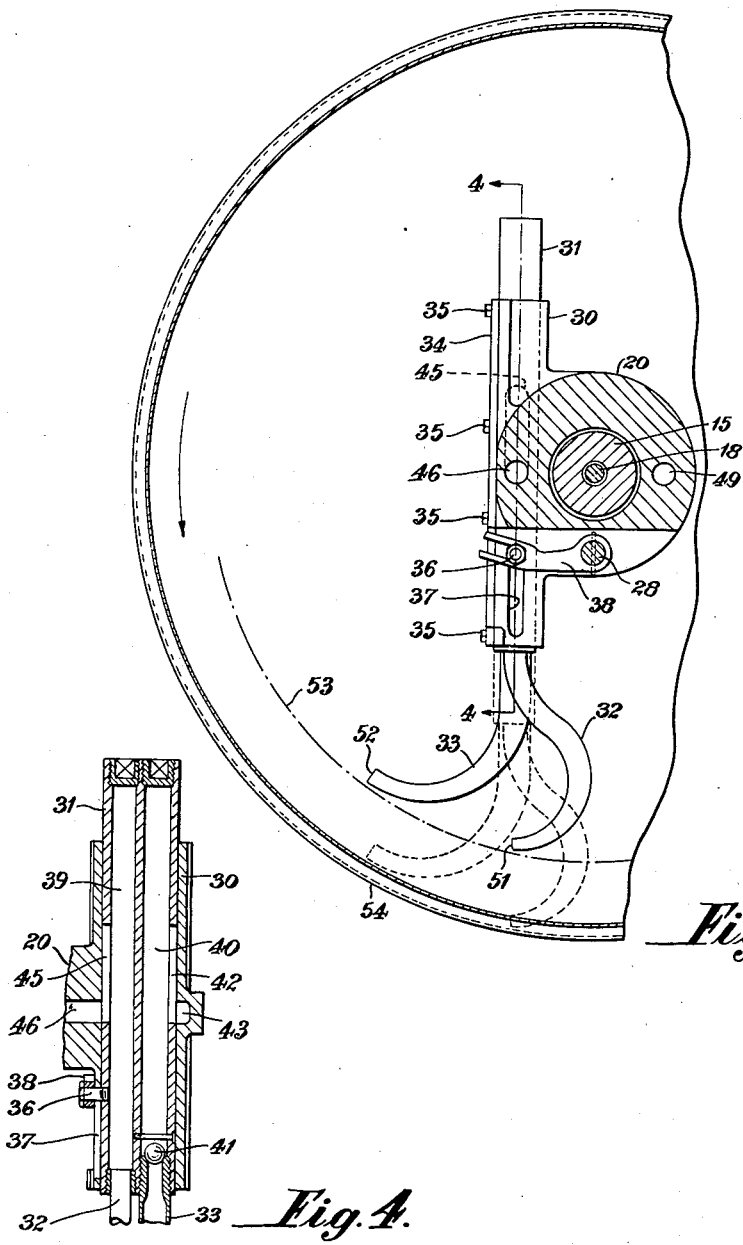

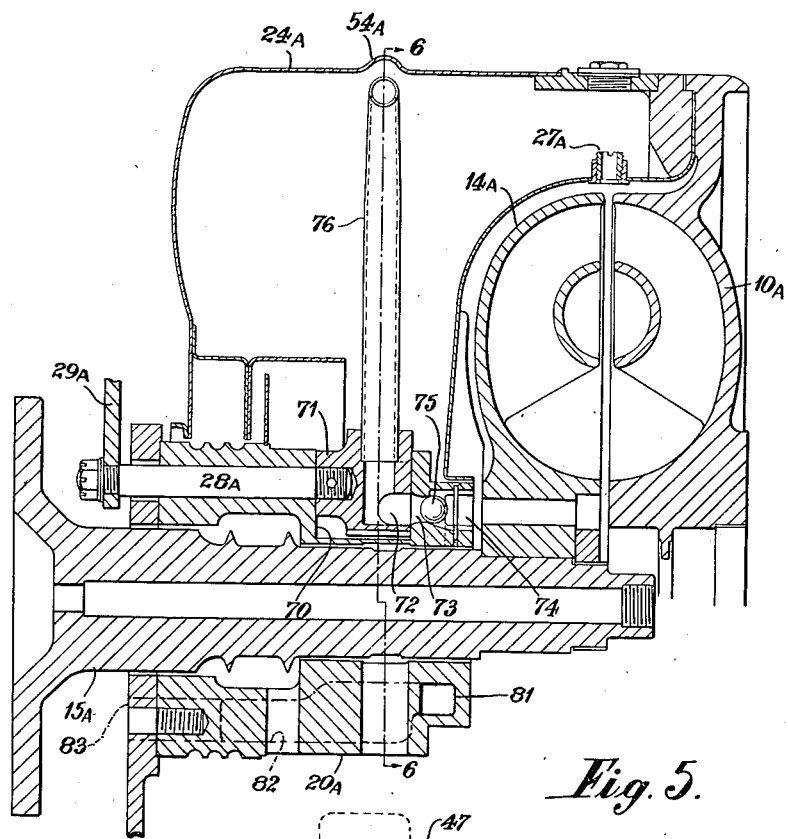
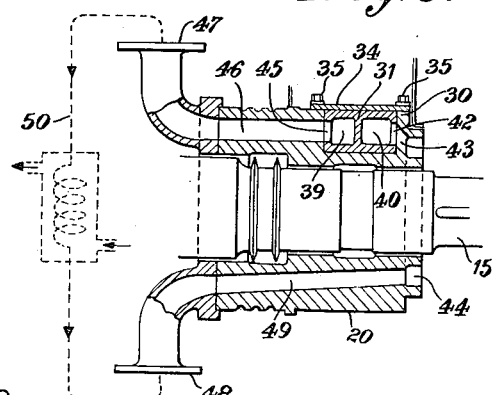
Fig. 5.
Fig. 3.

Dec. 2, 1941.  H. SINCLAIR ET AL  2,264,341
ROTARY POWER TRANSMITTER EMPLOYING A WORKING LIQUID
Filed June 13, 1940  5 Sheets-Sheet 4

Inventors
Harold Sinclair
Arthur Cecil Basebe
Dean, Fairbank & Hirsch
attorneys

Patented Dec. 2, 1941

2,264,341

UNITED STATES PATENT OFFICE 2,264,341

ROTARY POWER TRANSMITTER EMPLOYING A WORKING LIQUID

Harold Sinclair, Kensington, London, and Arthur Cecil Basebe, Banstead, England

Application June 13, 1940, Serial No. 340,278
In Great Britain June 20, 1939

16 Claims. (Cl. 60—54)

This invention relates to rotary torque transmitters employing a working liquid, such for example as hydraulic couplings and brakes of the kinetic type and liquid actuated centrifugal clutches, and it is concerned with scooping means disposed in a rotary chamber of the transmitter for the purpose of withdrawing working liquid from the chamber, the scooping means being movable in such a way as to vary the spacing of the lip of the scooping means from the periphery of the chamber and thereby control the withdrawal of liquid therefrom.

An object of this invention is to provide an improved arrangement of scoop which is adapted to pick up, under different operating conditions, one stream of liquid and alternatively two distinct streams of liquid; for example the first of these streams may supply a cooling circuit while the other is employed when the liquid content of the chamber is required to be rapidly reduced.

In a rotary transmitter of the kind to which this invention relates the rotating ring of liquid in the chamber accommodating the scooping means causes a substantial reaction on such means when they are operating and the transmitter is running at high speed. In the scoop-controlled transmitters at present in use the scoop is arranged to rock about an axis parallel to the axis of rotation of the chamber, with the consequence that during operation there is imposed on the scoop a substantial torque which urges the scoop either to plunge into or rise out of the liquid ring, according to whether its lip moves with or against the adjacent liquid as it approaches the periphery of the chamber. Consequently relatively powerful control mechanism has to be provided for the actuation of the scoop. A further object of this invention is to provide an improved arrangement of scooping means which can be accurately controlled by reasonably light controlling forces.

In the known rocking scoop arrangements, the unavoidable resilience of the system, particularly in the scoop control connections, permits, under certain circumstances, an undesirable vibration in the scoop operating mechanism which is maintained by the action of the liquid impinging on the scoop, and another object is to provide controllable scooping means which are not subject to vibration.

The invention will be described by way of example with reference to the accompanying drawings, which show different embodiments applied to hydraulic turbo couplings, and in which:

Fig. 2 is a sectional end elevation taken on the line 2—2 in Fig. 1,

Figure 1:
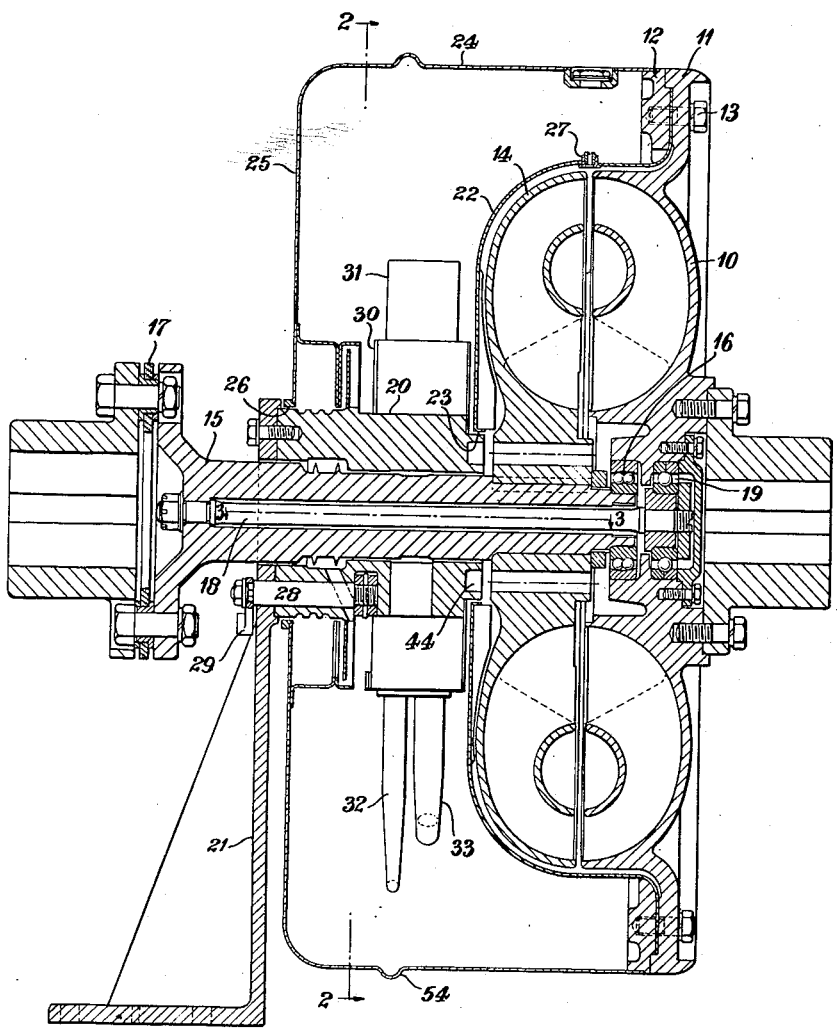
Fig. 1 is a sectional side elevation of a turbo coupling.
Figure 6:
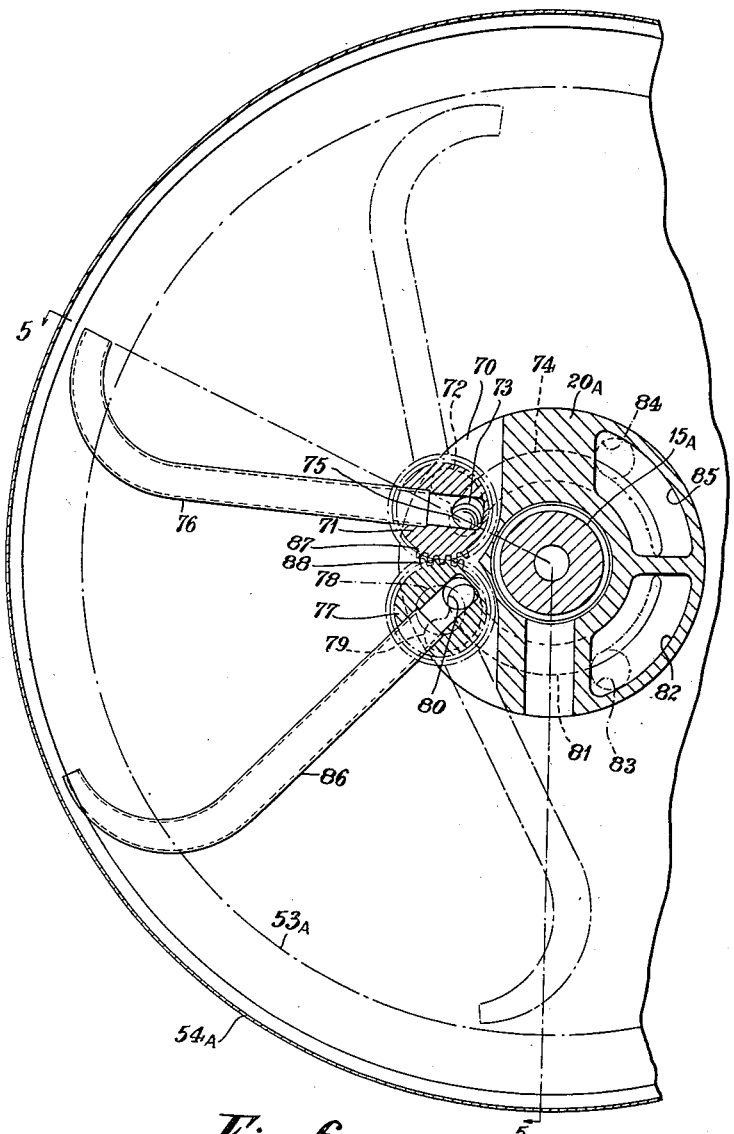
Figure 7:
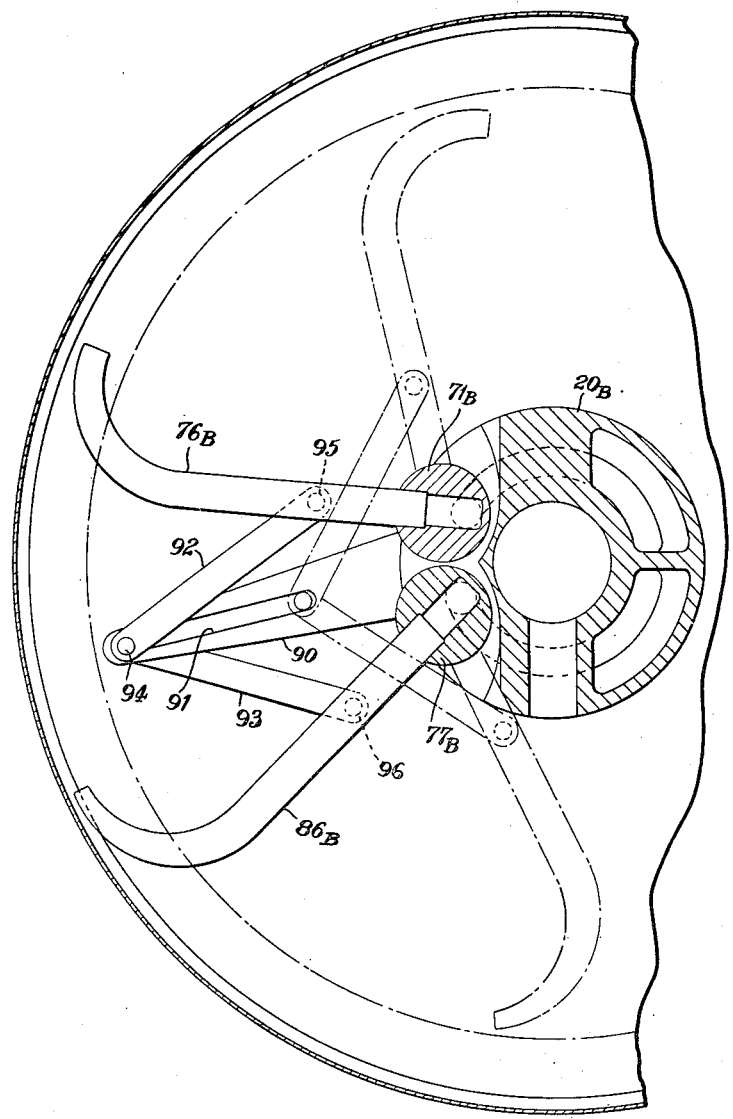

Fig. 3 is a sectional plan of a part of the same coupling taken on the line 3—3 in Fig. 1, Fig. 4 is a sectional side elevation of a detail taken on the line 4—4 in Fig. 2, Fig. 5 is a sectional side elevation of part of another form of turbo coupling, taken on the line 5—5 in Fig. 6, Fig. 6 is a sectional end elevation taken on the line 6—6 in Fig. 5, and Fig. 7 is a sectional end elevation of a further alternative form of turbo coupling.

Figs. 1–4 show a standard design of "Vulcan-Sinclair" scoop-controlled hydraulic coupling modified to embody the present invention. The coupling includes a vaned impeller 10 integral with an exterior flange 11 to which a ring 12 is secured by screws 13. A vaned runner 14 is fixed on a runner shaft 15 which is journalled in the hub of the impeller 10 by a self-aligning bearing 16 and supported through a flexible mechanical coupling 17 by a driven shaft not shown. Axial thrusts between the impeller and the runner are taken by a rod 18 fixed at one end to the runner shaft 15 and connected at the other end through a thrust bearing 19 to the impeller. A non-rotatable manifold sleeve 20 surrounds the runner shaft 15 with a small clearance and is fixed to a bracket 21. An inner dished casing 22 has its periphery clamped between the flange 11 and the ring 12 and its centre is provided with a flanged aperture 23 which accommodates with a small clearance the inner end of the sleeve 20. The casing 22 and the impeller 10 together enclose a working chamber. An outer casing includes a cylindrical part 24 welded at one end to the ring 12 and an end wall 25 having a central aperture 26 penetrated by the sleeve 20. The casings 22 and 24, 25 together form a reservoir chamber co-axial with the working chamber. A restricted exhaust nozzle 27 in the casing 22 serves to exhaust working liquid from the working chamber to the reservoir chamber while the coupling is operating. A control shaft 28 is journalled in the sleeve 20 and to it is fixed a lever 29 adapted to be connected to any suitable operating means, whereby the shaft 28 can be displaced in either direction of rotation and secured in various positions.

The sleeve 20 is provided with a straight channel shaped guide 30 lying tangentially to a circle concentric with the shaft 15. Within this guide is slidably fitted an element 31 which forms a double shank for two scoop tubes 32 and 33, being retained by a cover plate 34 secured by screws 35. A pin 36 attached to the shank element 31 projects through a slot 37 in the guide 30 and engages the forked end of an actuating lever 38, fixed to the control shaft 28. The element 31 has two separate longitudinal bores 39 and 40 communicating with the two scoop tubes 32 and 33, the latter of which is provided with a non-return valve 41. A slot 42 in the element 31 opening out of the bore 40 registers with a port 43 in the guide 30 which opens directly into a circular channel 44 formed in the inner end of the sleeve 20 inside the working chamber of the coupling. A slot 45 in the element 31 opening out of the bore 39 registers with a bore 46 in the guide 30 and sleeve 20 leading to a flow pipe connection 47. A return pipe connection 48 communicates by a bore 49 with the channel 44. A cooler circuit, indicated diagrammatically at 50, is connected between the pipe connections 47 and 48.

The scoop tube 32, which has a relatively small flow capacity, is so reversedly curved that its mouth 51, as seen in Fig. 2, is substantially below the vertical shank element 31 and is directed away from the vertical plane containing the axis of rotation of the coupling. This lip will therefore engage the ring of liquid, the direction of rotation of which is shown by an arrow in Fig. 2, at a point where its surface is only slightly inclined to the horizontal. The vertical component of the reaction of the liquid on the mouth 51 will therefore be insufficient to overcome the frictional restraint to sliding of the scoops due to the horizontal component, and the scooping device will accordingly be stable when only the small scoop 32 is operating. The neck of the scoop tube 33, which has a larger capacity, is curved away from the vertical plane containing the axis of rotation of the coupling in such a manner that the mouth 52 will engage the ring of liquid at a point where its surface is relatively more steeply inclined to the horizontal. If such inclination is sufficient, the vertical component of the reaction of the ring of liquid on the mouth 52 will be sufficient to overcome the frictional restraint due to the horizontal component, and the arrangement may be such that, when both scooping mouths 51 and 52 are operating, the equilibrium of the two scoops acting in unison is neutral or substantially so, so that a very small operating force is required to cause the scoops to be more deeply immersed. The relative positions of the mouths are such that, when the rotating reservoir chamber contains the maximum quantity of liquid, the inner surface of which is denoted by 53, and the scoops are lowered from their fully retracted position, shown in full lines in Fig. 2, the lips of both engage the liquid surface 53 at substantially the same instant, that is to say neither begins scooping alone, and the working chamber is rapidly filled to the desired degree, the rapid filling being facilitated by the additional scooping area of the large scoop tube 33 and the low hydraulic resistance of the direct filling passage 42, 43, 44 leading from this scoop. However, if the scoops are thereafter immersed to a substantial depth in the ring of liquid, as the liquid is withdrawn the liquid surface will recede below the mouth of the larger scoop 33 before it recedes below the mouth 51 of the smaller scoop 32. This arrangement therefore enables the larger scoop to operate immediately rapid filling of the working circuit is required, and it leaves the smaller scoop operative to maintain the cooling circulation of liquid passed by the nozzle 27 when the required degree of filling has been attained and the larger scoop has automatically ceased to operate. The non-return valve 41 under these conditions prevents liquid returned by the scoop tube 32 through the cooler circuit 50 from escaping to the reservoir through the inoperative scoop tube 33 in consequence of any pressure which may exist in the inner end of the sleeve 20.

When the liquid content of the working chamber is the maximum, the mouth of the smaller scoop is partly accommodated in a circumferential outward bulge 54 in the reservoir wall 24, as shown by dotted lines in Fig. 2.

The tangential disposition of the shanks of the scoop tubes and their guide enables a sliding bearing surface to be secured which is adequate for rigidity and durability and it also permits the use of a simple operative connection to the control member.

The turbo coupling shown in Figs. 5 and 6 is in some respects similar to that shown in Figs. 1 to 4; parts of the former which correspond to parts of the latter are denoted by the same reference numerals to which however the reference letter A is added. The construction in Figs. 5 and 6 differs from that in Figs. 1 to 4 in that rockable scoop tubes replace the slidable scoop tubes. A transverse groove 70 is formed in the manifold sleeve 20A and accommodates a boss 71 fixed at one end to the control shaft 28A. An arcuate port 72 in the other end of the boss 71 registers with a port 73 in the groove 70 leading to an arcuate channel 74 in the inner end of the sleeve 20A and opening directly into the working chamber. The port 73 is provided with a non-return ball valve 75. A scoop tube 76 is fixed to the boss 71. A second boss 77 is fixed to a pin 78 which is indicated by a chain-dotted circle in Fig. 6 and which is journalled in the sleeve 20A similarly to, and at the same distance from the axis of the shaft 15A as, the shaft 28A. An arcuate port 79 in the boss 77 registers with a port 80 in the groove 70 leading through an arcuate duct 81 and a longitudinal duct 82 in the sleeve 20A to a port 83 adapted to be coupled to the flow pipe to the cooler, such as is shown in Fig. 3. The return pipe from the cooler is coupled to a return port 84 in the outer end of the sleeve. Since the ports 83 and 84 are located in front of the section plane on which Fig. 6 is shown, their positions are indicated by chain-dotted circles in Fig. 6. The port 84 communicates by a longitudinal duct 85 with the arcuate channel 74 that opens into the working chamber. A scoop tube 86, fixed to the boss 77 has a mouth which is smaller than that of the scoop tube 76 and which extends somewhat further from the axis of the boss 77 than does the mouth of the scoop tube 76 from the axis of the boss 71. The bosses 71 and 77 are provided with co-operating toothed sectors 87 and 88 whereby they are constrained to rock equally and oppositely.

In Fig. 6 the scoop tubes appear in full lines in their fully operative positions, in which the mouth of smaller capacity tube 86 lies partly within the circumferential outward bulge 54A in the wall 24A and the mouth of the larger capacity tube 76 is not so far removed from the axis of rotation of the coupling. The inoperative positions of the scoop tubes are indicated by broken lines. When the impeller is rotating and the scoops are in the inoperative positions, any liquid that may be in the working chamber escapes through the exhaust nozzle 27A, so that the liquid content of the coupling as a whole constitutes a ring rotating with the reservoir chamber. The surface of this ring is denoted by 53A. When the scoops are moved to operative positions by the control lever 29A, both come into action and the working chamber is rapidly filled to the desired degree. Under these conditions the differences in length and mouth area of the two scoops are such that their reactions are nearly completely balanced so long as their scooping lips are immersed to a substantial depth, and thus reasonably light controlling forces will give accurate and rapid control of the degree of filling of the working chamber. As this filling rises to the desired value, the surface of the decreasing liquid ring in the reservoir chamber withdraws clear of the scoop 76, leaving the smaller capacity scoop 86 to return to the working chamber the restricted flow of liquid which is exhausted through the nozzle 27A, and passed through the cooler before it is returned to the working chamber.

Fig. 7 shows an arrangement identical with that shown in Figs. 5 and 6 except that the scoop-tube bosses 71B and 77B are connected together not by toothed sectors but by a link- and slider mechanism arranged as follows. Links 92 and 93 are pivotally connected respectively at 95 and 96 to the scoop tubes 76B and 86B and are pivotally connected together by a pin 94 constrained to slide in a slot 91 in an arm 90 rigidly attached to the manifold sleeve 20B. The boss 71B is directly actuated by the control shaft, and the link-and-slider system constrains the scoop tube 86B to move substantially equally and oppositely to the scoop tube 76B.

We claim:

1. A hydraulic torque transmitter of the kinetic type comprising a working chamber, a rotatable reservoir chamber for holding a rotating ring of liquid, means for exhausting heated liquid from said working chamber to said reservoir chamber, a cooler, movable scooping means in said reservoir chamber for engaging said liquid ring and including two scoops of relatively large and small capacities respectively, a duct leading from the smaller of said scoops through said cooler to said working chamber, a duct leading from the larger of said scoops to said working chamber and by-passing said cooler, and common control means operatively connecting said scoops for causing them to move simultaneously toward positions such that the lips of both of said scoops are immersed in the ring of liquid.

2. A hydraulic torque transmitter of the kinetic type comprising a working chamber, a rotatable reservoir chamber for holding a rotating ring of liquid, means for exhausting heated liquid from said working chamber to said reservoir chamber, a cooler, movable scooping means in said reservoir chamber for engaging said liquid ring and including two scoops of relatively large and small capacities respectively, a duct leading from the smaller of said scoops through said cooler to said working chamber, a duct leading from the larger of said scoops to said working chamber and by-passing said cooler, and common control means operatively connecting said scoops for causing them to move from positions such that said scoops are inoperative, through positions such that the mouths of both of said scoops are capable of simultaneously engaging a relatively deep ring of liquid in said reservoir chamber, to positions such that the mouth of only the smaller of said scoops engages a relatively shallow ring of liquid in said reservoir chamber after said working chamber is filled.

3. A hydraulic torque transmitter of the kinetic type comprising a working chamber, a rotatable reservoir chamber for holding a rotating ring of liquid, means for exhausting heated liquid from said working chamber to said reservoir chamber, a cooler, movable scooping means in said reservoir chamber for engaging said liquid ring and including two scoops of relatively large and small capacities respectively, a duct leading from the smaller of said scoops through said cooler to said working chamber, a duct leading from the larger of said scoops to said working chamber and by-passing said cooler, and common control means operatively connecting said scoops for causing them to move from inoperative positions such that their lips are clear of a ring of liquid of a given depth in said reservoir chamber to positions in which the lip of the smaller of said scoops is closely adjacent to the peripheral boundary of said reservoir chamber while the lip of the larger of said scoops is not so far removed from the axis of rotation of said liquid ring.

4. A hydraulic torque transmitter of the kinetic type comprising a working chamber, a rotatable reservoir chamber for holding a rotating ring of liquid, means for exhausting heated liquid from said working chamber to said reservoir chamber, a cooler, movable scooping means in said reservoir chamber for engaging said liquid ring and including a first scoop associated with a duct leading therefrom through said cooler to said working chamber, and a second scoop associated with a duct leading therefrom to said working chamber and by-passing said cooler and common control means operatively connecting said scoops for causing them to move simultaneously from inoperative positions and to attain operative positions such that the lip of said first scoop is farther removed than is the lip of said second scoop from the axis of rotation of said reservoir chamber.

5. In a torque transmitter employing a working liquid, a rotatable chamber for holding a rotating ring of liquid, a non-rotatable member penetrating an end wall of said chamber, a scoop tube within said chamber and having a shank lying tangentially to a circle concentric with and within the periphery of said chamber, a guide on said member in which said shank is slidable, and a control member movably mounted on said non-rotatable member and operatively connected with said scoop tube for displacing the latter so as to vary the spacing of its scooping lip from said periphery.

6. A torque transmitter employing a working liquid and comprising a rotatable chamber for holding a rotating ring of liquid, a non-rotatable member penetrating an end wall of said chamber, a straight guide on said member and lying tangentially to a circle concentric with and within the periphery of said chamber, a scoop tube having a shank slidable in said guide, said shank and said guide having ports capable of registering with each other, and said member having a duct leading from the port in said guide to the exterior of said chamber, and a control member movably mounted on said non-rotatable member and operatively connected with said scoop tube for displacing the latter so as to vary the spacing of its scooping lip from said periphery.

7. In a torque transmitter employing a working liquid, a rotatable chamber for holding a rotating ring of liquid, a non-rotatable member penetrating an end wall of said chamber, a scoop tube within said chamber and having a shank lying tangentially to a circle concentric with and within the periphery of said chamber, a guide on said member in which said shank is slidable, a control shaft rotatably journalled on said member, a crank on said control shaft and means on said scoop tube engaging said crank.

8. A torque transmitter employing a working liquid and comprising a rotatable chamber for holding a rotating ring of liquid, a shaft of said transmitter disposed co-axially within said chamber, a stationary sleeve surrounding a part of said shaft within said chamber, a guide on said sleeve having an effective length exceeding the diameter of said sleeve, a scoop tube having a shank disposed transversely of said shaft and slidable in said guide, and a control member mounted on said sleeve and operatively associated with said scoop tube for varying the spacing of the lip of the scoop tube from the periphery of said chamber, said shank having a port which co-operates with a duct in said guide leading to the exterior of said chamber.

9. In a torque transmitter employing a working liquid, a rotatable chamber for holding a rotating ring of liquid, a non-rotatable member penetrating an end wall of said chamber, a scoop tube within said chamber and having a shank lying tangentially to a circle concentric with and within the periphery of said chamber, a guide on said member in which said shank is slidable, and a control member movably mounted on said non-rotatable member and operatively connected with said scoop tube for displacing the latter so as to vary the spacing of its scooping lip from said periphery, the mouth of said scoop tube lying, with respect to the longitudinal middle plane of said chamber, to which said shank is parallel, on the same side of said plane as said shank, and being directed away from said plane.

10. In a torque transmitter employing a working liquid, a rotatable chamber for holding a rotating ring of liquid, a non-rotatable member penetrating an end wall of said chamber, a scoop tube within said chamber and having a shank lying tangentially to a circle concentric with and within the periphery of said chamber, a guide on said member in which said shank is slidable, and a control member movably mounted on said non-rotatable member and operatively connected with said scoop tube for displacing the latter so as to vary the spacing of its scooping lip from said periphery, the mouth of said scoop tube lying on the side of said shank opposite to said centre and being so directed that the reaction of liquid engaged thereby urges said scoop towards deeper engagement in the ring of liquid.

11. A rotary power transmitter including a rotatable working chamber, a rotatable reservoir chamber for holding a rotating ring of liquid, a non-rotatable member penetrating an end wall of said reservoir chamber, a first scoop tube within said reservoir chamber and having a shank lying tangentially to a circle concentric with and within the periphery of said reservoir chamber, a second scoop tube within said reservoir chamber and having a shank lying tangentially to a circle concentric with and within the periphery of said reservoir chamber, guide means on said member in which said shanks are slidable, a cooler, a first duct leading from said first scoop through said member to said cooler and thence through said member to said working chamber, a second duct leading from said second scoop through said member directly to said working chamber, and control means movably mounted on said member and operatively connected to said scoop tubes for simultaneously moving them in a like sense between their operative and inoperative positions.

12. A torque transmitter employing a working liquid and comprising a rotatable chamber for holding a rotating ring of liquid, a scoop housed in said chamber for engaging the ring of liquid, the scoop being movable for the purpose of varying the distance of its scooping lip from the periphery of said chamber, a reaction compensating member also disposed in said chamber and movable relatively to said scoop and to the axis of rotation of said chamber, and an operative connection between said scoop and said member for causing the reaction of the rotating ring of liquid on said member to oppose the reaction of the rotating ring of liquid on the scoop.

13. In a torque transmitter employing a working liquid, a rotatable chamber for holding a rotating ring of liquid, a first scoop housed in said chamber for engaging the ring of liquid and being movable for the purpose of varying the distance of its scooping lip from the periphery of said chamber, a second scoop disposed in said chamber and movable relatively to said first scoop and to the axis of rotation of said chamber, and an operative connection between said scoops which are arranged to move in such paths that the reaction on one of said scoops opposes the tendency to motion of the other of said scoops under the influence of the rotating ring of liquid.

14. In a torque transmitter employing a working liquid, a rotatable reservoir chamber for holding a rotating ring of liquid, a scoop within said chamber and capable of angular displacement eccentrically with respect to the axis of rotation of said chamber, a reaction compensating member displaceable in said chamber relatively to said axis and to said scoop, and an operative connection between said scoop and said member for causing the reaction of the ring of liquid on said member to balance at least in part the reaction of the ring of liquid on said scoop.

15. In a torque transmitter employing a working liquid, a rotatable reservoir chamber for holding a rotating ring of liquid, a scoop within said chamber and capable of angular displacement eccentrically with respect to the axis of rotation of said chamber, a reaction compensating member within said chamber and capable of angular displacement relatively to said scoop and eccentrically with respect to said axis, and an operative connection between said scoop and said member for causing the tendency to displacement of said scoop to be opposed by the tendency to displacement of said member due to the reactions of the rotating ring of liquid.

16. In a torque transmitter employing a working liquid, a rotatable reservoir chamber for holding a rotating ring of liquid, a first scoop within said chamber and angularly displaceable eccentrically with respect to the axis of rotation of said chamber from an inoperative position to an operative position in such a sense that its lip moves in the same direction as the adjacent part of the rotating ring of liquid, a second scoop within said chamber and angularly displaceable eccentrically with respect to said axis from an inoperative position to an operative position in such a sense that its lip moves in the opposite direction to the adjacent part of the rotating ring of liquid and an operative connection between said scoops for constraining them to move simultaneously in the said respective senses.

HAROLD SINCLAIR.
ARTHUR CECIL BASEBE.